(12) United States Patent
Oikawa

(10) Patent No.: US 8,556,232 B2
(45) Date of Patent: *Oct. 15, 2013

(54) LINEAR SOLENOID AND VALVE DEVICE USING THE SAME

(75) Inventor: Naoki Oikawa, Miyagi (JP)

(73) Assignee: Keihin Corporation, Tokyo (JP)

( * ) Notice: Subject to any disclaimer, the term of this patent is extended or adjusted under 35 U.S.C. 154(b) by 197 days.

This patent is subject to a terminal disclaimer.

(21) Appl. No.: 12/887,819

(22) Filed: Sep. 22, 2010

(65) Prior Publication Data

US 2011/0073791 A1    Mar. 31, 2011

(30) Foreign Application Priority Data

Sep. 30, 2009   (JP) ................................ 2009-228178

(51) Int. Cl.
  *F16K 31/02*  (2006.01)
(52) U.S. Cl.
  USPC ............. 251/129.15; 251/129.01; 251/129.07
(58) Field of Classification Search
  USPC .......................... 251/129.01, 129.07, 129.15; 137/625.69
  See application file for complete search history.

(56) References Cited

U.S. PATENT DOCUMENTS

| | | | |
|---|---|---|---|
| 4,643,227 A * | 2/1987 | Suzuki et al. ............. | 137/625.38 |
| 4,662,605 A * | 5/1987 | Garcia ...................... | 251/129.08 |
| 4,919,390 A * | 4/1990 | Ichiryu et al. ............. | 251/129.15 |
| 5,123,718 A * | 6/1992 | Tyler .......................... | 303/118.1 |
| 5,487,410 A * | 1/1996 | Niethammer ............ | 137/625.65 |
| 5,727,769 A * | 3/1998 | Suzuki ...................... | 251/129.15 |
| 5,848,613 A * | 12/1998 | Sakaguchi et al. ........ | 137/625.65 |
| 5,918,635 A * | 7/1999 | Wang et al. ............... | 137/625.65 |
| 6,019,203 A * | 2/2000 | Patel et al. ...................... | 192/3.3 |
| 6,062,536 A * | 5/2000 | Bircann ..................... | 251/129.15 |
| 6,092,784 A * | 7/2000 | Kalfsbeck ................ | 251/129.15 |
| 6,206,343 B1 * | 3/2001 | Kato et al. ................ | 251/129.15 |
| 6,315,268 B1 * | 11/2001 | Cornea et al. ............. | 251/129.15 |
| 6,446,606 B1 * | 9/2002 | Krimmer et al. .............. | 123/458 |
| 6,547,215 B2 * | 4/2003 | Matsusaka et al. ....... | 251/129.15 |
| 6,601,822 B2 * | 8/2003 | Tachibana et al. ........ | 251/129.15 |

(Continued)

FOREIGN PATENT DOCUMENTS

| | | |
|---|---|---|
| JP | 10-231945 | 9/1998 |
| JP | 2005-299919 | 10/2005 |
| JP | 2006-097723 A | 4/2006 |
| JP | 2007-056910 | 3/2007 |

OTHER PUBLICATIONS

Notice of Reasons for Refusal dated Jul. 16, 2013 issued in corresponding Japanese Patent Application No. 2009-228178.

*Primary Examiner* — Eric Keasel
*Assistant Examiner* — Matthew W Jellett
(74) *Attorney, Agent, or Firm* — Arent Fox LLP

(57) ABSTRACT

The present invention provides a linear solenoid portion, comprising: a cylindrical movable core which is attracted toward a fixed core when a coil is energized: and a cylindrical yoke which surrounds an outer circumference surface of the movable core, in which the movable core is not provided with a shaft, a first stopper which limits a displacement of the movable core to a side of a fixed core is pushed into a through hole of the fixed core at one end of the movable core along an axial direction, and a second stopper which limits a displacement in a direction to be spaced apart from the fixed core is held to a bottom surface of a housing by swaging at other end of the movable core along the axial direction.

8 Claims, 10 Drawing Sheets

(56) References Cited

U.S. PATENT DOCUMENTS

| | | | |
|---|---|---|---|
| 6,612,544 B2* | 9/2003 | Sakata et al. | 251/129.15 |
| 6,615,780 B1* | 9/2003 | Lin et al. | 123/90.17 |
| 6,695,284 B2* | 2/2004 | Isobe et al. | 251/129.15 |
| 6,866,242 B2* | 3/2005 | Hirota | 251/129.07 |
| 6,883,544 B2* | 4/2005 | Kawamura et al. | 137/625.65 |
| 6,899,313 B2* | 5/2005 | Carrillo et al. | 251/129.08 |
| 6,922,124 B2* | 7/2005 | Segi et al. | 335/220 |
| 6,968,816 B2* | 11/2005 | Isobe et al. | 123/90.17 |
| 6,969,043 B2* | 11/2005 | Hirata et al. | 251/129.15 |
| 7,040,595 B2* | 5/2006 | Hirota | 251/129.07 |
| 7,075,394 B2* | 7/2006 | Matsusaka et al. | 335/80 |
| 7,131,426 B2* | 11/2006 | Ichinose et al. | 123/446 |
| 7,468,647 B2* | 12/2008 | Ishibashi et al. | 335/281 |
| 8,134,436 B2* | 3/2012 | Yasoshima | 335/220 |
| 2001/0013584 A1* | 8/2001 | Matsusaka et al. | 251/129.15 |
| 2002/0101314 A1* | 8/2002 | Oishi et al. | 335/256 |
| 2003/0047699 A1* | 3/2003 | Sakata et al. | 251/129.15 |
| 2003/0075702 A1* | 4/2003 | Isobe et al. | 251/129.15 |
| 2004/0011980 A1* | 1/2004 | Hirota | 251/129.07 |
| 2004/0011982 A1* | 1/2004 | Hirata et al. | 251/129.15 |
| 2004/0041114 A1* | 3/2004 | Hirata et al. | 251/129.15 |
| 2004/0056227 A1* | 3/2004 | Mayr et al. | 251/129.15 |
| 2005/0211938 A1* | 9/2005 | Ryuen et al. | 251/129.15 |
| 2008/0203342 A1* | 8/2008 | Ryuen et al. | 251/129.15 |
| 2008/0308757 A1* | 12/2008 | Nakai et al. | 251/129.15 |
| 2009/0032753 A1* | 2/2009 | Ishibashi et al. | 251/129.15 |
| 2009/0224192 A1* | 9/2009 | Oikawa et al. | 251/129.15 |
| 2009/0301588 A1* | 12/2009 | Shimizu et al. | 137/625.64 |
| 2010/0308244 A1* | 12/2010 | Oikawa et al. | 251/129.15 |
| 2010/0326552 A1* | 12/2010 | Suzuki et al. | 137/625.64 |
| 2011/0147630 A1* | 6/2011 | Nisinosono et al. | 251/129.15 |

* cited by examiner

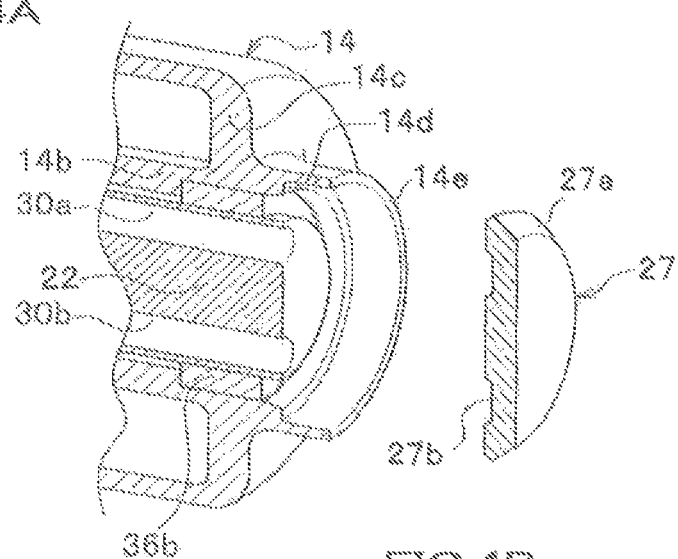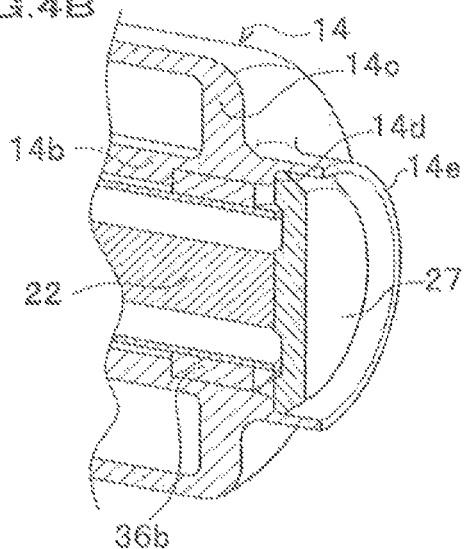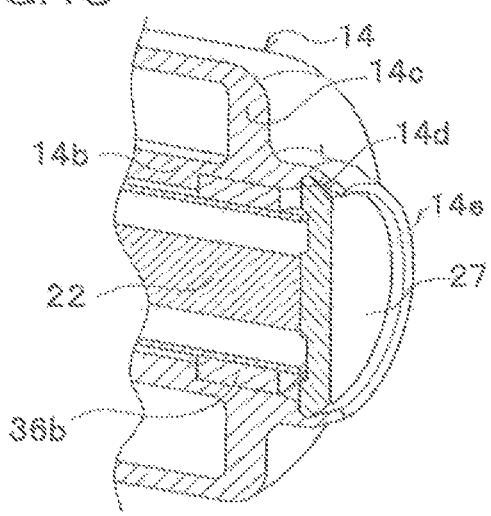

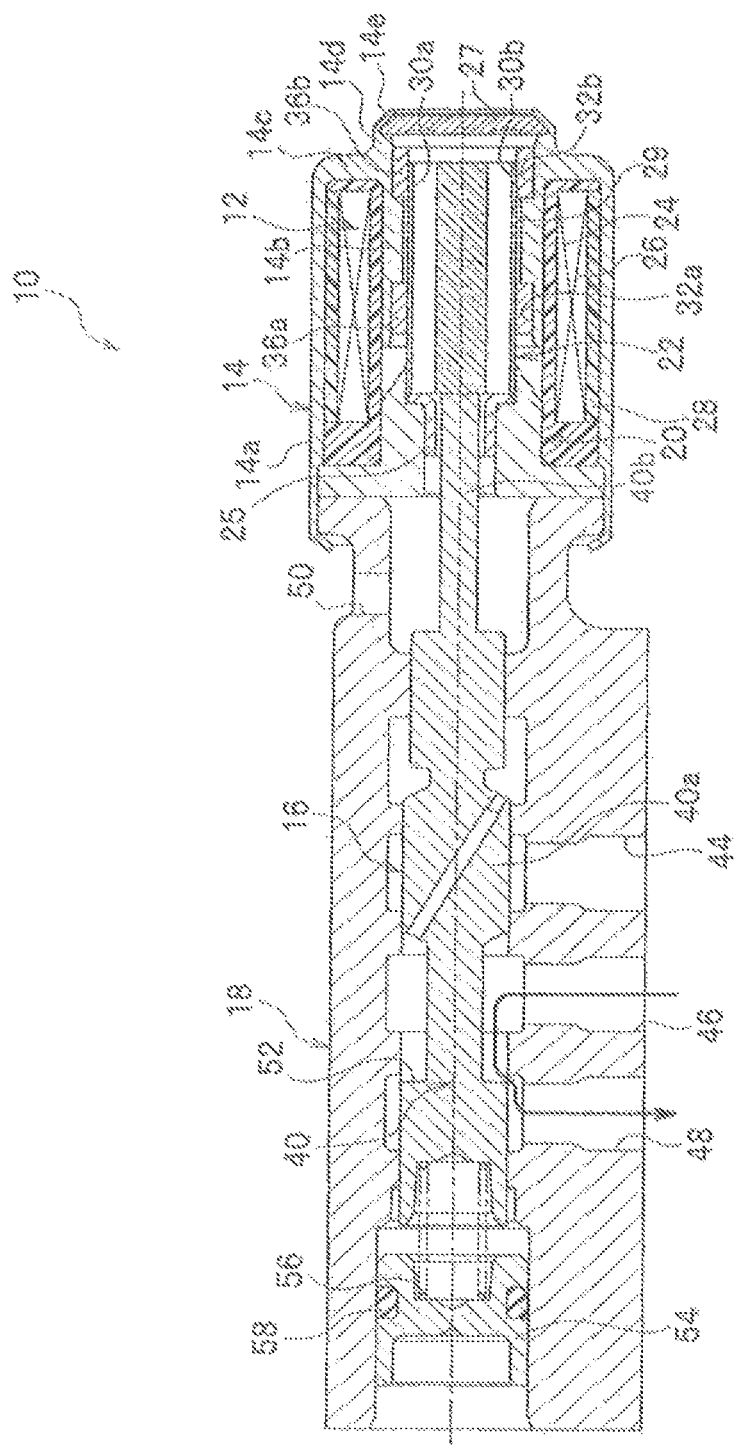

LINEAR SOLENOID AND VALVE DEVICE USING THE SAME

CROSS REFERENCE TO RELATED APPLICATIONS

The present application claims benefit of the filing date of Japanese Patent Application No. 2009-228178 filed on Sep. 30, 2009, the disclosure of which is incorporated herein by reference.

BACKGROUND OF THE INVENTION

1. Field of the Invention

The present invention relates to a linear solenoid which causes an excitation effect by being energized and a valve device using the same.

2. Description of the Related Art

Conventionally, a linear solenoid valve having a valve element to switch between a communication state and a discommunication state of an inlet port and an outlet port by transmitting a displacement of a movable core caused by an excitation effect of a solenoid has been used.

As for such a linear solenoid valve, the present applicant has proposed a linear solenoid valve which enables an enhancement of an attractive force to a movable core (e.g., see JP 2006-097723 A).

In such a linear solenoid valve disclosed in JP 2006-097723 A, both ends of a shaft passing through a center of the movable core are supported by a first plain bearing and a second plain bearing respectively, and the first and second plain bearings are made of a sintered compact including a sintered metal.

By the way, in the linear solenoid valve disclosed in JP 2006-097723 A, by arranging a nonmagnetic ring to engage with the shaft attached to the movable core, a nonmagnetic stopper to prevent the movable core from contacting the fixed core is constructed.

However, in recent years, a shaft-less movable core has become popular at the request of miniaturization of the linear solenoid valve. In this case, there arises a problem that the nonmagnetic ring can not be arranged so as to engage with the movable core because the shaft-less movable core is not provided with a shaft.

In view of the foregoing, an object of the present invention is to provide a linear solenoid in which a nonmagnetic stopper to prevent the movable core from contacting the fixed core can be set easily if the movable core is not provided with the shaft, and a valve device using the same.

SUMMARY OF THE INVENTION

In order to achieve the above object, the present invention provides a linear solenoid portion which is provided in a housing, comprising: a coil; a fixed core; a shaft-less cylindrical movable core which is attracted toward the fixed core when the coil is energized; and a cylindrical yoke which surrounds an outer circumference surface of the movable core, in which as recess to which the movable core faces is formed on the fixed core, a first stopper which is made of a nonmagnetic material and limits a displacement of the movable core in one direction is provided in a hole which continues to the recess, and the first stopper is provided with an inserting hole through which a displacement transmission member to transmit the displacement of the movable core is inserted.

According to the present invention, the recess to which the movable core faces is formed on the fixed core, the first stopper which is made of the nonmagnetic material and limits the displacement of the movable core in one direction is provided in the hole which continues to the recess, and the first stopper is provided with the inserting hole through which the displacement transmission member to transmit the displacement of the movable core. As a result, in the present invention, even if the movable core is not provided with the conventional shaft (i.e., a shaft-less structure), the first stopper can be set easily as the nonmagnetic stopper to prevent the movable core from contacting the fixed core.

Also, in the present invention, the housing has a housing bottom surface which is provided at one end of the housing along an axis of the housing, and the housing bottom surface is provided with a second stopper which is made of a nonmagnetic material and limits the displacement of the movable core in another direction, and a swaging portion which swages the second stopper so as to hold it.

According to the present invention, the housing bottom surface is provided with the second stopper which is made of the nonmagnetic material and limits the displacement of the movable core in another direction, and the swaging portion which swages the second stopper so as to hold it. As a result, in the present invention, by providing the second stopper which is made of the nonmagnetic material and limits the displacement of the movable core in another direction with the housing, a space in which the movable core is provided can be prevented from being contaminated easily, and the movable core can be prevented from being affixed to the second stopper. In addition, in the present invention, by providing the swaging portion with the housing bottom surface, the second stopper can be held to the housing bottom surface easily, the assembling operation can be facilitated, and the assembly performance can be enhanced.

Further, in the present invention, the housing comprises: a housing bottom surface which is provided at one end of the housing along an axis of the housing; and a projecting bottom portion which extends from the housing bottom surface, in which the projecting bottom portion is provided with the second stopper which is made of the nonmagnetic material and limits the displacement of the movable core in another direction, and the second stopper is fixed to the projecting bottom portion by swaging a cylindrical portion passing through a through hole of the projecting bottom portion.

According to the present invention, the housing is provided with the projecting bottom portion which extends from the housing bottom surface, and the second stopper which is made of the nonmagnetic material and limits the displacement of the movable core in another direction. As a result, in the present invention, by providing the second stopper which is made of the nonmagnetic material and limits the displacement of the movable core in another direction, a space in the housing in which the movable core is provided can be prevented from being contaminated easily, and the movable core can be prevented from being affixed to the second stopper. In addition, in the present invention, by swaging the cylindrical portion passing through the through hole of the projecting bottom portion so as to fix the second stopper to the projecting bottom portion, the second stopper can be held to the housing bottom surface easily, the assembling operation can be facilitated, and the assembly performance can be enhanced.

Still further, in the present invention, one or more bearings for slidably supporting the movable core are provided along an axis of the cylindrical yoke, and the bearing projects by a predetermined length from an inner circumference surface of the cylindrical yoke toward the movable core in a radial direction.

According to the present invention, by providing one or more bearings for slidably supporting the movable core along the axis of the cylindrical yoke, the cylindrical yoke can be made coaxial with the movable core easily. By making the cylindrical yoke coaxial with the movable core, a side force (a force to attract the movable core outwardly in a radial direction) can be decreased, and a preferable hysteresis property can be obtained.

Still further, according to the present invention, a valve device comprising: a valve body having a plurality of ports through which a pressure fluid flows; a linear solenoid; and valve operating mechanism which is provided within the valve body and has a valve element for switching between a communication state and a discommunication state among the plurality of ports by displacement of the movable core is provided.

The valve device as described above allows the linear solenoid to be miniaturized and the hysteresis property to be enhanced, resulting in miniaturization and weight reduction of the entire valve device.

BRIEF DESCRIPTION OF THE DRAWINGS

FIGS. 4A-4C are schematic diagrams showing a process for swaging a second stopper to a cylindrical projection of a housing;

FIG. 6 is a longitudinal cross-sectional view showing that the linear solenoid portion shown in FIG. 1 at an off state is energized so that the movable core is displaced and abuts on the first stopper;

DETAILED DESCRIPTION OF THE PREFERRED EMBODIMENTS

Figure 1:
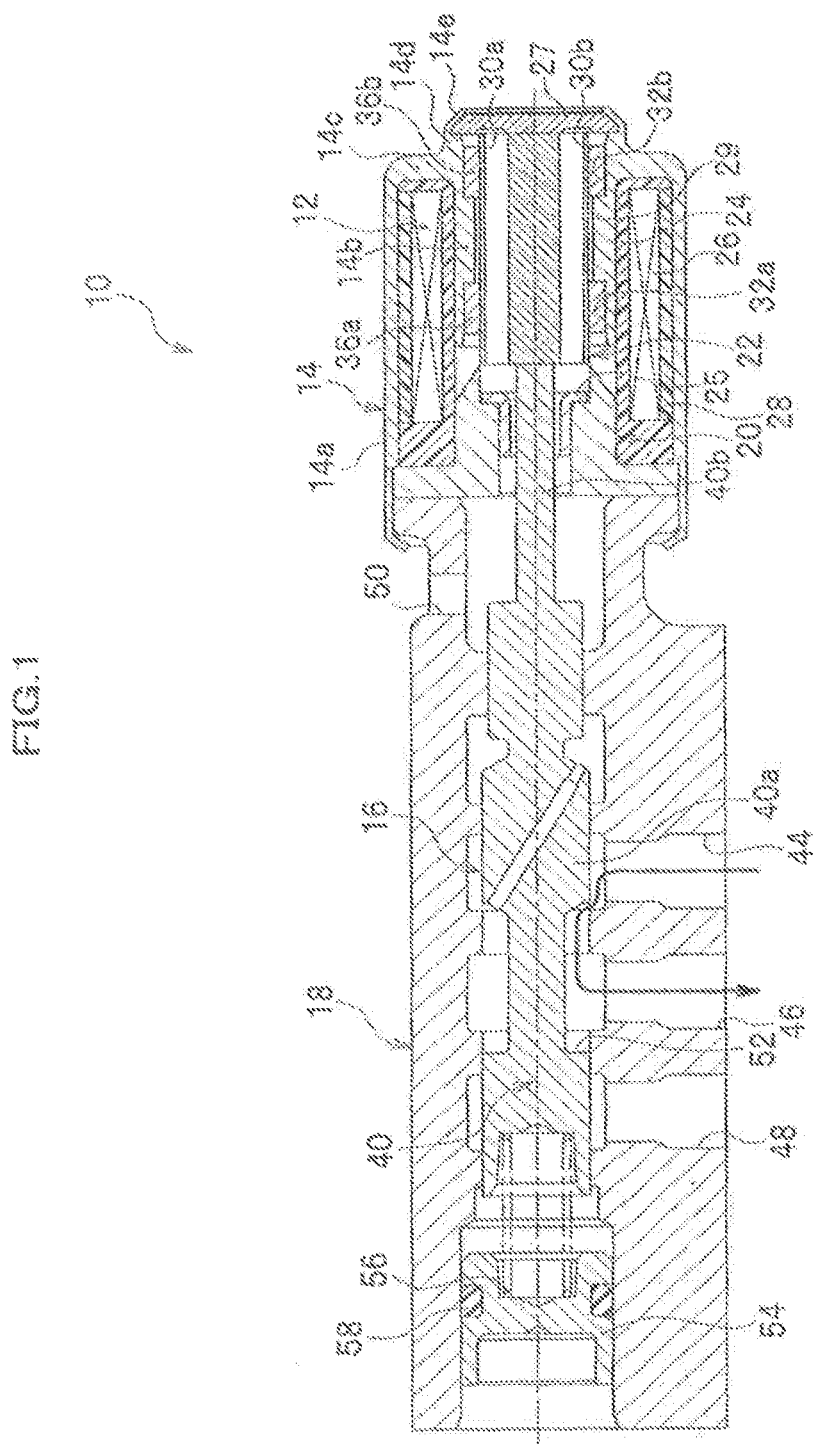
FIG. 1 is a longitudinal cross-sectional view of an oil pressure control unit, in which a linear solenoid according to an embodiment of the present invention is incorporated, along an axial direction.

Next, with reference to FIGS. 1-10, embodiments of the present invention will be explained in detail. FIG. 1 is a longitudinal cross-sectional view of an oil pressure control unit, in which a linear solenoid according to an embodiment of the present invention is incorporated, along an axial direction; and FIG. 2 is an enlarged longitudinal cross-sectional view of the linear solenoid portion of the oil pressure control unit shown in FIG. 1.

As shown in FIG. 1, for example, an oil pressure control unit (a valve device) 10 comprises a cylindrical housing 14 which has a bottom and is made of a magnetic metal material, a linear solenoid portion (linear solenoid) 12 which is provided within the housing 14, a sleeve valve body 18 which is connected to the housing 14 integrally, and a valve operating mechanism 16 which is provided within the valve body 18.

Figure 2:
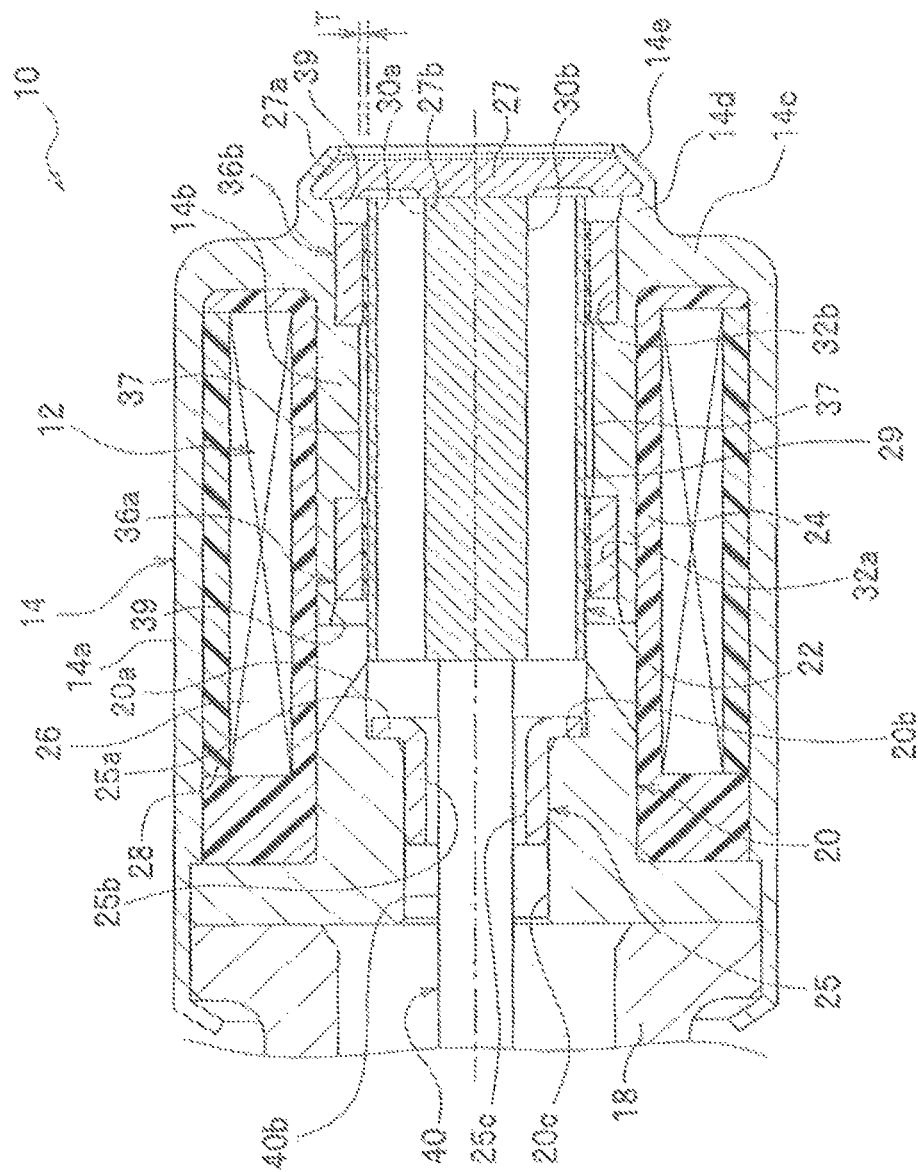
FIG. 2 is an enlarged longitudinal cross-sectional view of the linear solenoid portion of the oil pressure control unit shown in FIG. 1.

As shown in FIGS. 1 and 2, the long housing 14 is formed along an axial direction, and includes a cylindrical portion 14a which is provided on an outmost surface of the housing 14; a short cylindrical yoke 14b which is spaced apart by a predetermined distance from the cylindrical portion 14a in an inner radial direction and extends approximately parallel to the cylindrical portion 14a; and a housing bottom surface 14c which is formed at one end of the cylindrical portion 14a and the cylindrical yoke 14b (at a connecting portion) in the axial direction and whose axial thickness is thicker than a radial thickness of the cylindrical portion 14a.

Further, the housing 14 has a cylindrical projection 14d which continues to the housing bottom surface 14c and extends approximately parallel to the cylindrical portion 14a, and a thin swaging portion 14e which extends from the cylindrical projection 14d and swages a second stopper (described below) so as to hold it. In this case, the cylindrical portion 14a, the cylindrical yoke 14b, the housing bottom surface 14c, the cylindrical projection 14d, and the swaging portion 14e are integrally formed.

In addition, for example, the cylindrical yoke 14b may be formed by press-fitting other yoke (not shown) composed of an approximately-cylindrical body which is other component than the housing 14 into a fitting portion (not shown) formed on an inner circumference surface of the housing bottom surface 14c.

As shown in FIGS. 1 and 2, the linear solenoid portion 12 has a coil assembly which is accommodated in the housing 14, a cylindrical yoke 14b which is integrally formed with the housing 14 at an blocked end of the housing 14 and is provided within the coil assembly, a fixed core 20 which is connected to an open end of the cylindrical portion 14a and is arranged inside the coil assembly along the axial direction via the cylindrical yoke 14b and a predetermined clearance, the movable core 22 which is displaceably arranged inside the cylindrical yoke 14b, and a nonmagnetic first stopper 25 which limits the displacement of the movable core 22 to the side of the fixed core 20 (the displacement in one direction).

Figure 3A:
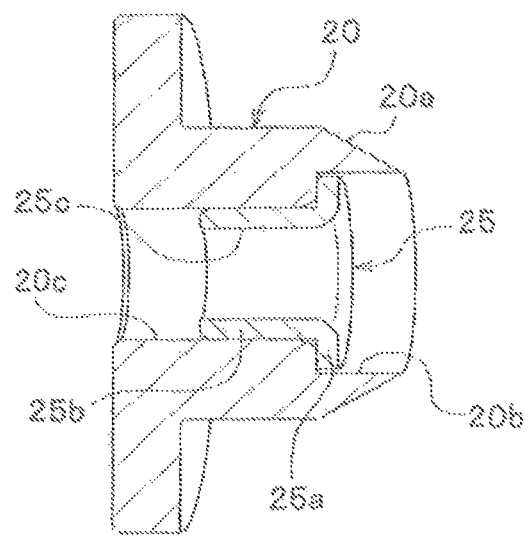
FIG. 3A is an enlarged longitudinal cross-sectional perspective view showing a first stopper is pushed into the fixed core.

As shown in FIGS. 2 and 3A, at one end of the fixed core 20 which is spaced apart by a predetermined distance from and opposed to the movable core 22, an annular flange 20a having a tapered face on an outer circumference surface whose diameter gradually decreases and whose longitudinal section face has a sharp angle, an annular recess 20b formed on an internal diameter side of the annular flange 20a, and a through hole 20c which extends along the axial direction from the recess 20b are provided.

The first stopper 25 is made of the nonmagnetic material, and is composed of an annular flange 25a which engages with the recess 20b of the fixed core 20, and a cylindrical portion 25b which continues to the flange 25a and is pushed into the through hole 20c of the fixed core 20. Through the cylindrical portion 251), an inserting hole 25c into which the shaft of a described below spool (a displacement transmission member) is inserted is provided.

The coil assembly is made of a resin material, and composed of a coil bobbin 24 having flanges at both ends along the axial direction, and a coil 26 wound around the coil bobbin 24.

At the opposite end of the movable core 22 which opposed to the first stopper 25 along the axial direction, a nonmagnetic second stopper 27 to limit the displacement in a direction to be spaced apart from the fixed core 20 of the movable core 22 (the displacement in another direction) is provided.

As shown in FIGS. 2 and 4A, the second stopper 27 is a disc member made of a nonmagnetic material, and a tapering surface 27a is formed on an outer circumference surface which is held by the swaging portion 14e of the housing 14. Also, on an inner wall face of the second stopper 27 which is opposed to a movable core 22, an annular groove 27b which makes one fluid passage hole 30a of the movable core 22 communicate with other fluid passage hole 30b is formed.

In this case, as shown in FIGS. 4A-4C, the cylindrical projection 14d (the housing 14) is blocked by inserting the second stopper 27 along the swaging portion 14e of the housing 14 so that the second stopper 27 abuts the cylindrical projection 14d and pressing the thin swaging portion 14e inwardly to be bent by a pressing means (not shown).

In other embodiment, by forming the cylindrical projection 14d on the housing 14 and making the disc second stopper 27 to block the cylindrical projection 14d with a nonmagnetic material, a space in the housing 14 in which the movable core 22 is provided can be prevented from being contaminated easily, and the movable core 22 can be prevented from being affixed to the second stopper 27.

Returning to FIG. 2, between the housing 14 and the coil 26, a resin sealing member 28 to mold the outer circumference surface of the coil 26, etc., is provided, and the resin sealing member 28 includes a coupler (not shown) connected to the coil 26 and is integrally molded by the resin material. In the coupler, terminals (not shown) which are electrically connected to the coil 26 is provided.

Figure 3B:
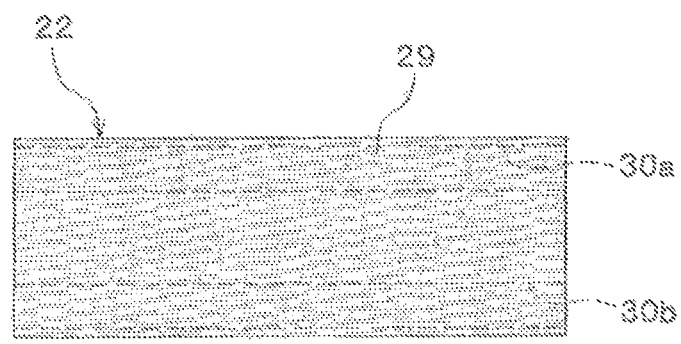
FIG. 3B is a side view of the movable core.

As shown in FIG. 3B, the movable core 22 is composed of a shaft-less cylindrical body without a conventional shaft passing through its center portion. On the whole outer surface of the cylindrical body, a hard layer 29 which has a predetermined thickness, and is formed by e.g., Kanigen plating (an electroless Ni plating, registered trademark), etc., is provided. Also, the cylindrical body is provided with a plurality of fluid passage holes 30a and 30b which are spaced apart by about 180 degrees in the circumferential direction and pass through the movable core 22 along the axial direction. Through the fluid passage holes 30a and 30b, a pressure oil at one end of the movable core 22 along the axial direction can communicate with a pressure oil at another end.

Returning to FIG. 2 again, at one end of the movable core 22 along the axial direction, a first plain bearing 36a which is attached to (pushed into) an annular recess 32a formed at an inner circumference surface of the cylindrical yoke 14b is provided, and the movable core 22 is slidably supported by the first plain bearing 36a along the axial direction. Also, at other end of the movable core 22 along the axial direction, a second plain bearing 36b which is attached to (pushed into) an annular recess 32b formed at the inner circumference surface of the cylindrical yoke 14b in the vicinity of the housing bottom surface 14c is provided, and the movable core 22 is slidably supported by the second plain bearing 36b along the axial direction. In addition, the movable core 22 may be integrally molded with a shaft 40b of a spool 40 (described below).

In the longitudinal section shown in FIG. 2, the first plain bearing 36a and the second plain bearing 36b are composed of the annular body having a constant internal diameter. For example, the annular body may be a bearing composed by laminating an outer diameter layer (a back metal layer) made of a metal material such as a SPCC (Japanese Industrial Standards), etc., a sintered bronze layer (an intermediate layer) made by sintering a bronze, etc., and a resin layer (an internal diameter layer) which is a sliding surface to the movable core 22 and is made of a resin material such as Polytetrafluoroethylene resin, etc. For example, this bearing may be a sliding bearing having a self-lubricity, and can enhance the slidability by using the sliding bearing having such as self-lubricity.

Internal diameter surfaces of the first plain bearing 36a and the second plain bearing 36b which slidingly contact the outer circumference surface of the movable core 22 are provided to be projected from the inner circumference surface of the cylindrical yoke 14b by a predetermined length T in the radial direction (see FIG. 2). Therefore, the movable core 22 slidingly contacts only the first plain bearing 36a and the second plain bearing 36b, and a gap 37 corresponding to the projection length (the predetermined length T) is formed in the radial direction between the inner circumference surface of the cylindrical yoke 14b and the outer circumference surface of the movable core 22. This gap 37 functions as a magnetic gap in the radial direction between the movable core 22 and the cylindrical yoke 14b.

In addition, at regions adjacent to annular recesses 32a and 32b of the cylindrical yoke 14b into which the first and second plain bearings 36a and 36b are pushed, a tapering surface 39 which functions as a guiding surface when the first plain bearing 36a and the second plain bearing 36b are attached to the cylindrical yoke 14b respectively is formed.

In this way, by the first and second plain bearings 36a and 36b arranged on the same cylindrical yoke 14b, both ends of the movable core 22 can be slidably supported. As a result, a straight traveling stability of the movable core 22 can be obtained, the cylindrical yoke 14b can be made coaxial with the movable core 22 easily, and the hysteresis property of the linear solenoid portion 12 can be enhanced.

Returning to FIG. 1, the valve operating mechanism 16 comprises an inlet port 44, an outlet port 46, a valve body 18 which is provided with drain ports 48, 50 respectively, and a spool (a valve element) 40 which abuts on an end face of the movable core 22 of the linear solenoid portion 12 and is pushed into by the movable core 22 so as to be slidably arranged along a space within the valve body 18.

In addition, the drain port 50 takes in and discharges the pressure oil within the housing 14 in accordance with the forward-backward movement of the movable core 22. Also, the inlet port 44, the outlet port 46, and the drain port 48 function as a plurality of ports through which the pressure fluid passes.

The spool 40 has a valve, and the valve is composed of a land portion 40a having a plurality of lands which is formed to radially extend outward, and a shaft 40b which is slidably inserted into the through hole of the fixed core 20 and one end of which abuts on the end face of the movable core 22.

Also, on the outer circumference surface of the spool 40, an annular recess 52 through which the inlet port 44 communicates with the outlet port 46 or the outlet port 46 communicates with the drain port 48 in accordance with a displaced position of the spool 40 is formed.

Further, as shown in FIG. 1, the valve operating mechanism 16 has a block member 54 which is arranged to be opposed to the end face of the spool 40 so as to block the space of the valve body 18, and a return spring 56 which is interposed between the spool 40 and the block member 54 and restores the spool 40 to its original position. In addition, on the outer circumference surface of the block member 54, a seal ring 58 to keep an attached portion liquid-tight or air-tight via an annular groove is provided.

For example, the inlet port 44 is connected to a hydraulic pressure source (a pressure fluid supply source) such as a hydraulic pump (not shown), etc., respectively via a supply hydraulic passage, the outlet port 46 is connected to a hydraulic pressure operation unit of a hydraulic equipment (not shown) via an output hydraulic passage, and the drain port 48 is connected to a reservoir tank (not shown). In addition, this embodiment is explained using the pressure oil, but not limited to this. For example, a pressure fluid including compressed air or the like may be used as an operational media.

The oil pressure control unit 10 according to this embodiment is basically constituted as described above. Next, an explanation will be given on operations and operational effects of the oil pressure control unit 10.

First, attaching operation of the first and second plain bearings 36a and 36b to the cylindrical yoke 14b of the housing 14 will be explained based on FIG. 5.

Figure 5A:
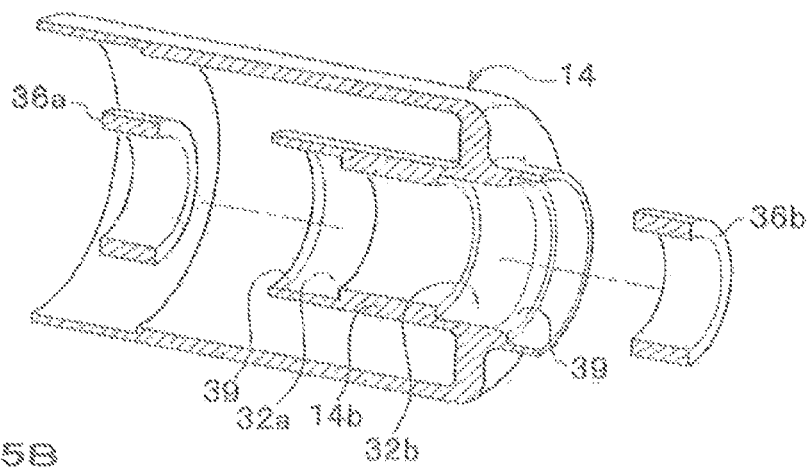
FIGS. 5A-5C are schematic diagrams showing a process of attaching a plain bearing, etc., to a cylindrical yoke.
Figure 5B:
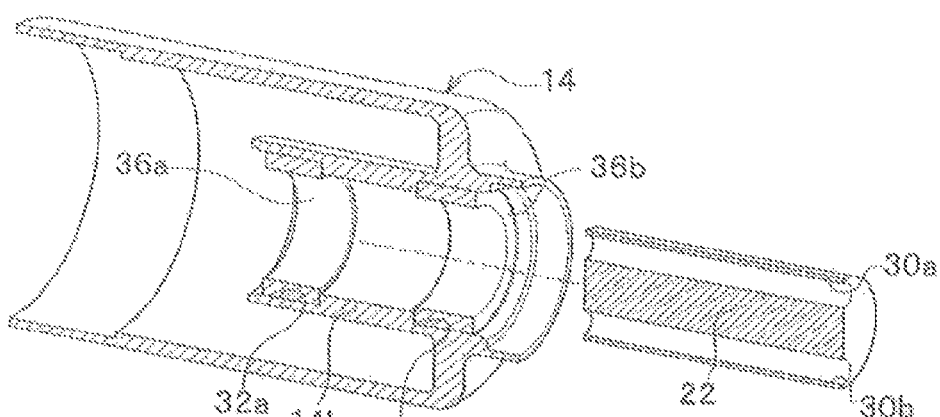
Figure 5C:
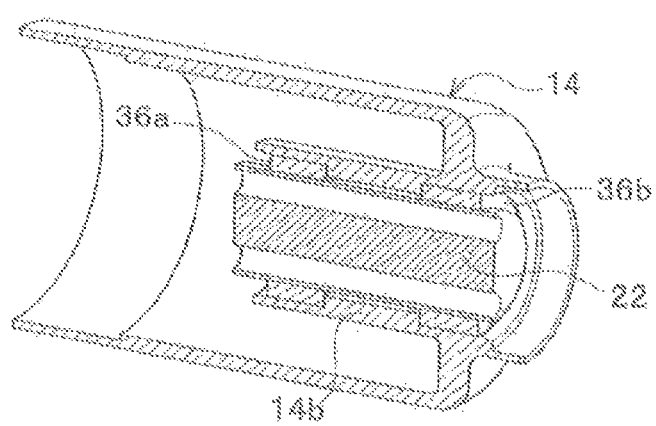

The first plain bearing 36a and the second plain bearing 36b are arranged at both ends of the cylindrical yoke 14b respectively along the axial direction (see FIG. 5A), the first plain bearing 36a and the second plain bearing 36b are slid along the tapering surface 39 which functions as a guiding surface, and the first plain bearing 36a and the second plain bearing 36b are pressed in a lateral direction of FIG. 5 to be pushed into the internal diameter surfaces of the annular recesses 32a and 32b whose diameters are slightly smaller than maximum outer diameters of the first plain bearing 36a and the second plain bearing 36b (see FIG. 5B). After the first plain bearing 36a and the second plain bearing 36b are pushed into the first annular recess 32a and the second annular recess 32b, the movable core 22 is inserted into the space within the ring-shaped first and second plain bearings 36a and 36b (see FIG. 5C).

In this way, according to this embodiment, by pushing the first plain bearing 36a and the second plain bearing 36b from both ends of the cylindrical yoke 14b respectively along the axial direction, the first plain bearing 36a and the second plain bearing 36b can be attached to the annular recesses 32a and 32b at both ends of the cylindrical yoke 14b in the axial direction easily, the assembling operation can be facilitated, and the assembly performance can be enhanced.

In addition, as shown in FIG. 4, an opening at the side of the cylindrical projection 14d of the housing 14 can be blocked easily by pressing the thin swaging portion 14e inwardly with the disc second stopper 27 being abutted on the cylindrical projection 14d.

Next, operation of the oil pressure control unit 10 will be explained.

As shown in FIG. 1, when the linear solenoid portion 12 is deenergized, because any electromagnetic force (any electromagnetic propelling force) of the linear solenoid portion 12 is not generated, the spool 40 is pushed toward the linear solenoid portion 12 by the spring force of the return spring 56. By a pressing force given to the spool 40, the movable core 22 abuts on the second stopper 27.

Therefore, as shown in FIG. 1, in the off state of the linear solenoid portion 12, the inlet port 44 communicates with the outlet port 46 through the annular recess 52 formed on the outer circumference surface of the spool 40 (see the arrow in FIG. 1) and the pressure oil which is taken in through the inlet port 44 is supplied to other member (not shown) through the annular recess 52 and the outlet port 46.

As described above, in the of state of the linear solenoid portion 12, the movable core 22 is at the original position without any displacement and is in a normal open state where the inlet port 44 communicates with the outlet port 46.

Next, when a power supply (not shown) supplies current to the linear solenoid portion 12, the linear solenoid portion 12 is switched to ON state. In the ON state, as shown in FIG. 6, an electromagnetic force in proportion to the current value supplied to the coil 26 allows the movable core 22 to slide along the first plain bearing 36a and the second plain bearing 36b and attracts the movable core 22 toward the fixed core 20, and then the movable core 22 stops at the displacement terminal position which abuts on the first stopper 25 held by the fixed core 20.

That is, the displacement of the movable core 22 caused by the excitation effect of the linear solenoid portion 12 is transmitted to the spool 40, and the spool 40 is displaced toward the block member 54 while moving against the spring force of the return spring 56.

Therefore, as shown in FIG. 6, the valve position is switched so that the communication between the inlet port 44 and the outlet port 46 is interrupted by the lands of the spool 40, and that the outlet port 46 communicates with the drain port 48 through the annular recess 52 formed on the outer circumference surface of the spool 40.

As a result, the outlet port 46 communicates with the drain port 48 through the annular recess 52 formed on the outer circumference surface of the spool 40 (see the arrow in FIG. 6) and the pressure oil which remains in the outlet port 46 is properly discharged from the drain port 48.

In this embodiment, the recess 20b to which the movable core 22 faces is formed on the fixed core 20, the first stopper 25 which is made of the nonmagnetic material and limits the displacement of the movable core 22 in one direction is provided in the through hole 20e which continues to the recess 20b, and the first stopper 25 is provided with the inserting hole 125c through which the spool 40 (the displacement transmission member) to transmit the displacement of the movable core 22 is inserted. As a result, in this embodiment, if the movable core 22 is not provided with the conventional shaft (i.e., the shaft-less structure), the first stopper 25 can be set easily as a nonmagnetic stopper to prevent contact to the fixed core 20 of the movable core 22.

Also, in this embodiment, the housing bottom surface 14c is provided with the second stopper 27 which is made of the nonmagnetic material and limits the displacement of the movable core 22 in another direction, and the swaging portion 14e which swages the second stopper 27 so as to hold it. As a result, in this embodiment, by providing the nonmagnetic second stopper 27 to limit the displacement of the movable core 22 in another direction, the space in which the movable core 22 is provided can be prevented from being contaminated easily. Further, in this embodiment, by providing the swaging portion 14e on the housing bottom surface 14e, the second stopper 27 can be held to the housing bottom surface 14c easily, the assembling operation can be facilitated, and the assembly performance can be enhanced.

Further, in this embodiment, the first stopper 25 is made of a nonmagnetic material, and is pushed into a through hole 20c to be held, so that the first stopper 25 has a function to prevent the movable core 22 from being kept to be absorbed by the fixed core 20 through the influence of the residual magnetism when coil 26 is deenergized (affixing protecting function).

Still further, in this embodiment, by providing a shaft-less structure having no conventional shaft to a movable core 22, magnetic flux density saturation of the movable core 22 can be reduced compared to a conventional structure having a shaft. As a result, the present invention can reduce the outer diameter and/or an axial length of the movable core 22 so as to miniaturize the movable core 22, resulting in miniaturization of the entire linear solenoid portion 12.

Also, in this embodiment, the first plain bearing 36a and the second plain bearing 36b are arranged at both ends of a cylindrical yoke 14b along an axis of the cylindrical yoke 14b respectively, and the movable core 22 can be made coaxial with the cylindrical yoke 14b easily. By making the movable core 22 coaxial with the cylindrical yoke 14b, a side force (a force to attract the movable core 22 outwardly in a radial direction) can be decreased, and a preferable hysteresis property can be obtained.

Next, an oil pressure control unit 100 in which a solenoid according to other embodiment of the present invention is incorporated will be explained below. In addition, the same numerical references as those of embodiment shown in FIG. 1 are used for the same components.

Figure 7:
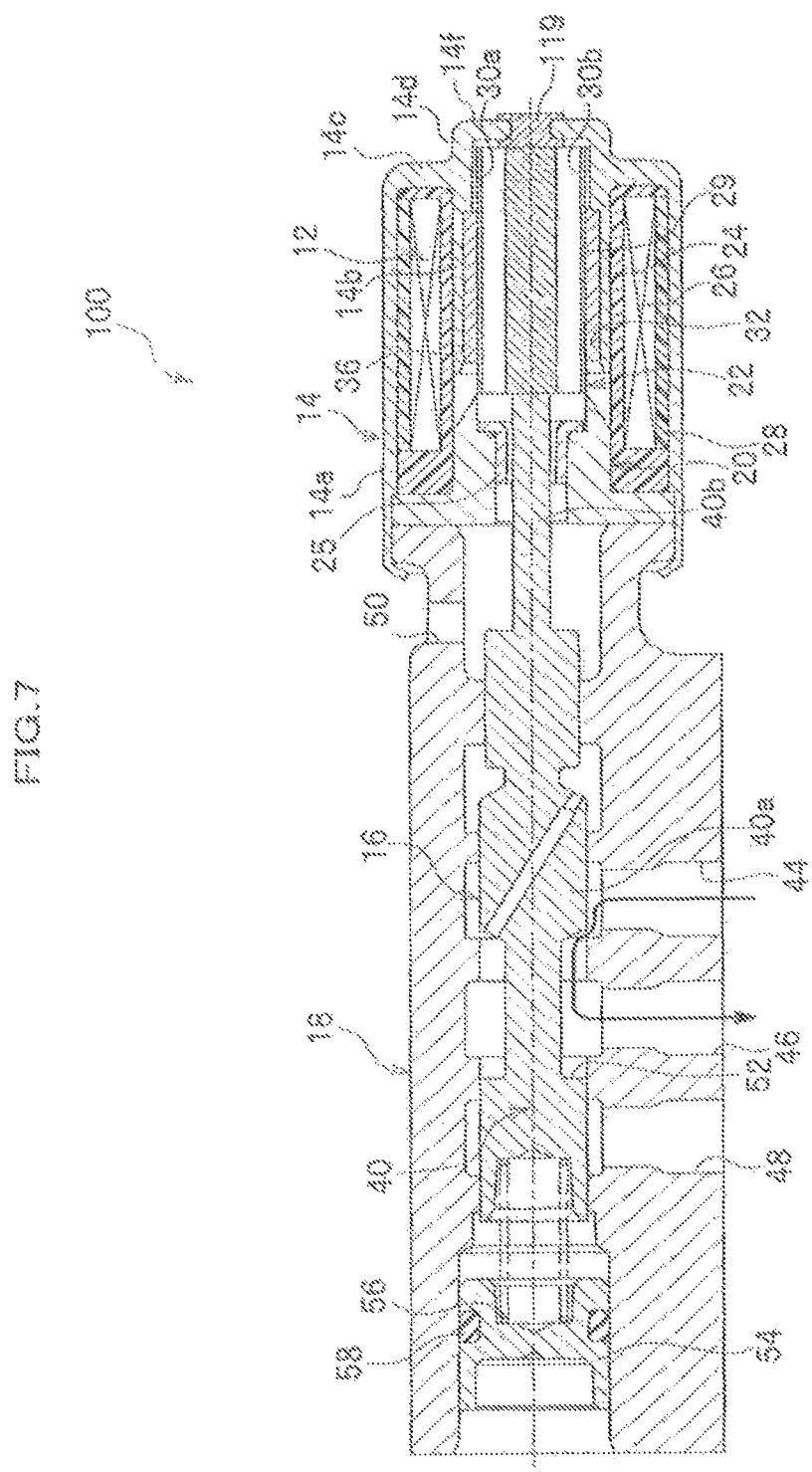
FIG. 7 is a longitudinal cross-sectional view of an oil pressure control unit, in which a linear solenoid according to other embodiment of the present invention is incorporated, along the axial direction.
Figure 8:
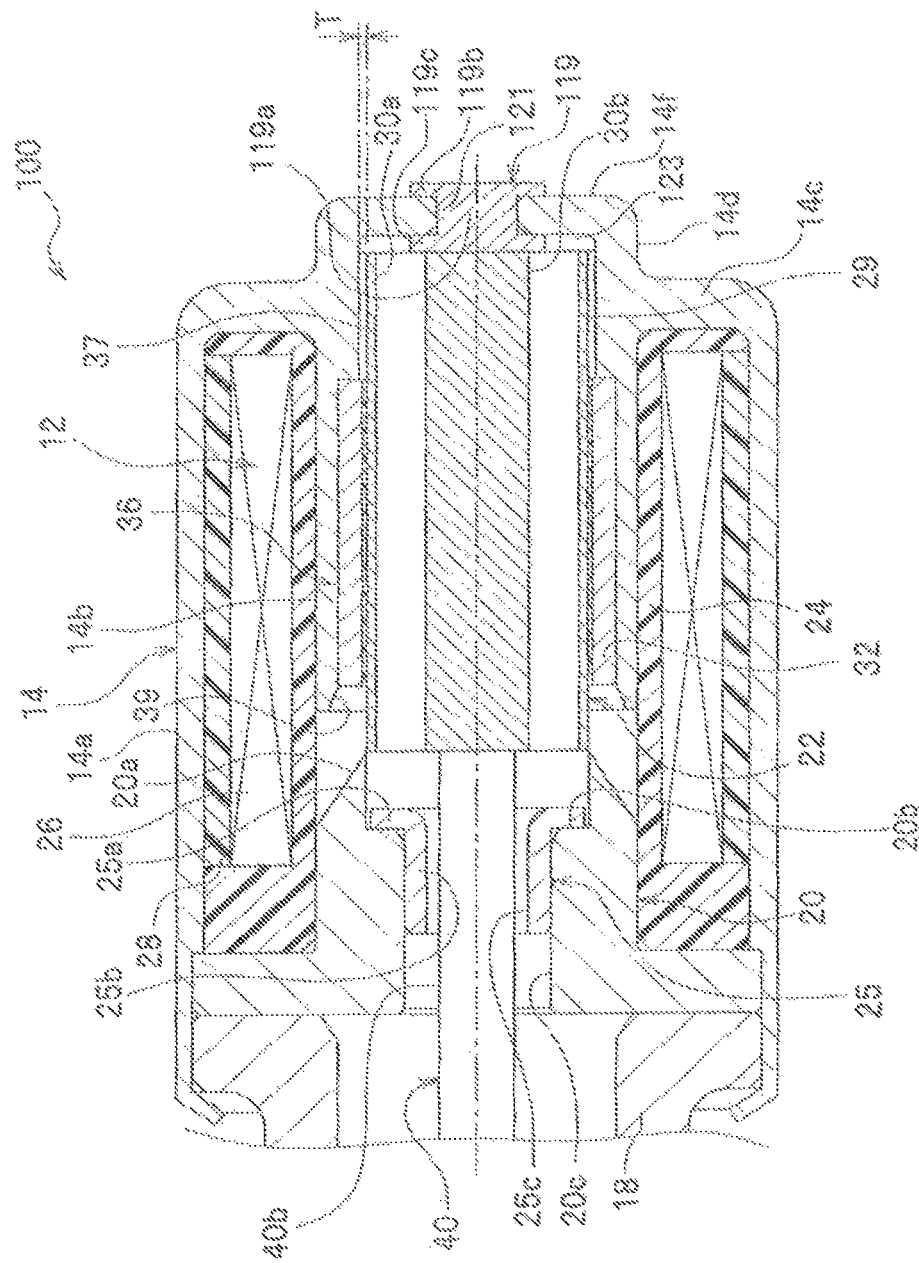
FIG. 8 is an enlarged longitudinal cross-sectional view of the linear solenoid portion of the oil pressure control unit shown in FIG. 7.
Figure 9:
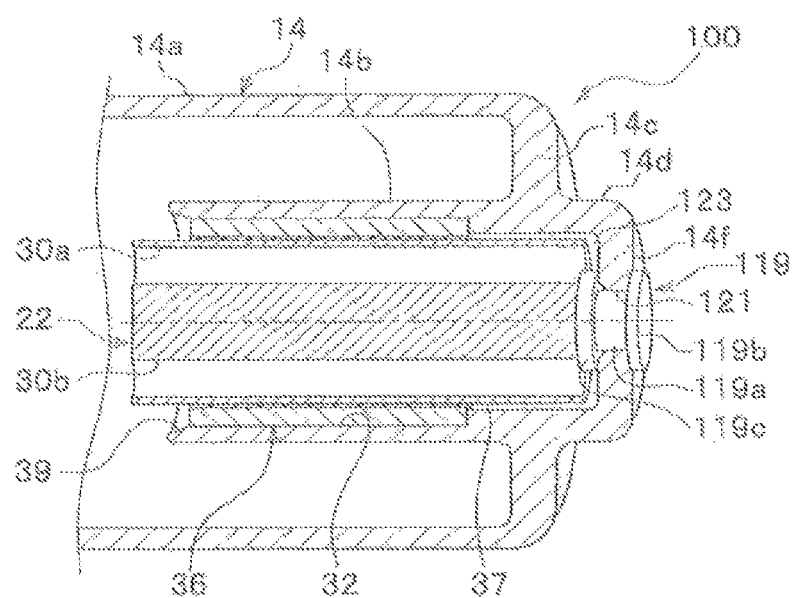
FIG. 9 is an enlarged longitudinal cross-sectional perspective view showing that the movable core abuts on a second stopper.
Figure 10A:
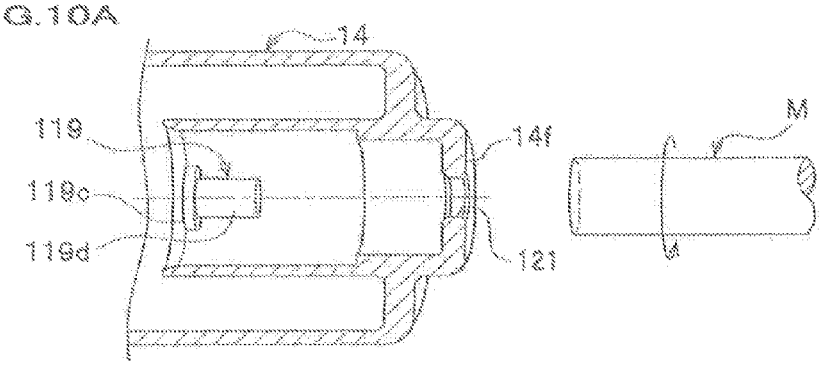
FIGS. 10A-10C are schematic diagrams showing a process for rolling swaging the second stopper to a housing bottom surface.
Figure 10B:
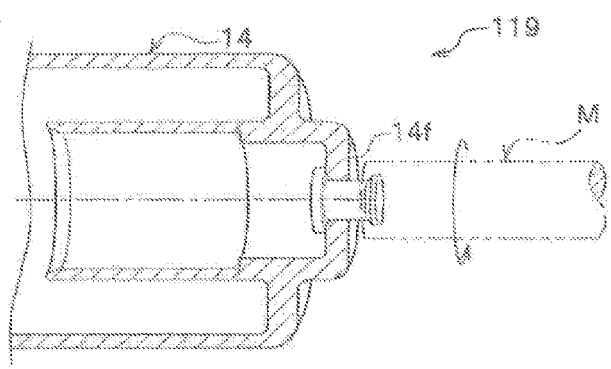
Figure 10C:
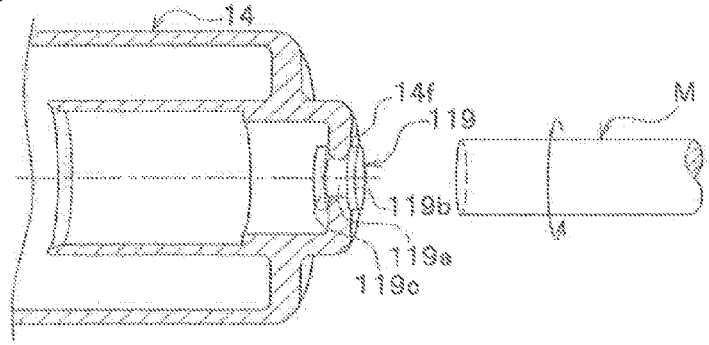

FIG. 7 is a longitudinal cross-sectional view of an oil pressure control unit, in which a linear solenoid according to other embodiment of the present invention is incorporated, along the axial direction. FIG. 8 is an enlarged longitudinal cross-sectional view of the linear solenoid portion of the oil pressure control unit shown in FIG. 7. FIG. 9 is an enlarged longitudinal cross-sectional perspective view showing that the movable core abuts on a second stopper. FIGS. 10A-10C are schematic diagrams showing a process for rolling swaging the second stopper to a housing bottom surface.

In addition, the other embodiment differs from the above described embodiment in that the second stopper 119 is held to the bottom surface of the housing 14 by rolling swaging and that a single plain bearing 36 (not a plurality of bearings 36) is provided. Because components such as the first stopper 25, etc., of the other embodiment are the same as those of the above described embodiment, detailed explanation will be omitted.

As shown in FIGS. 7 and 8, the housing 14 has a cylindrical projection 14d which continued to the housing bottom surface 14c and extends approximately parallel to the cylindrical portion 14a; and a projecting bottom portion 14f which has approximately the same thickness of that of the cylindrical projection 14d, extends from the cylindrical projection 14d, and to an approximate center of which a second stopper 119 (described below) is fixed. In this case, the cylindrical portion 14a, the cylindrical yoke 14b, the housing bottom surface 14c, the cylindrical projection 14d, and the projecting bottom portion 14f are integrally formed.

As shown in FIGS. 7-9, the second stopper 119 is composed of a nonmagnetic material member whose longitudinal section is approximately H-shaped, and functions as a stopper for limiting the displacement of the movable core 22 in another direction while one end of the movable core 22 in the axial direction abuts on the second stopper 119. The second stopper 119 is composed of a cylinder 119a which is held (or loosely fitted via a clearance) in the through hole 121 of the projecting bottom portion 14f, a disc 119b which engages with an outer wall side of the projecting bottom portion 14f, and a disc 119c which engages with an inner wall side of the projecting bottom portion 14f in addition, between the movable core 22 and the inner wall of the projecting bottom portion 14f which is opposed to the movable core 22, an annular gap 123 which makes one fluid passage hole 30a of the movable core 22 communicate with other fluid passage hole 30b is formed.

In this case, as shown in FIGS. 10A-10C, by inserting a cylindrical portion 119d of unprocessed second stopper 119 from an inner side of the housing 14 along the through hole 121 formed through the projecting bottom portion 14f of the housing 14 and by pressing the cylindrical portion 119d with a rotation axis M of a rolling swaging apparatus to plastically deform the cylindrical portion 119d, the diameter of the cylindrical portion 119d of the second stopper 119 is extended along the outer wall face of the projecting bottom portion 14f so as to form the disc 119b and the second stopper 119 is fixed to the approximate center of the projecting bottom portion 14f.

In other embodiment, the projecting bottom portion 14f is formed at the housing 14 so as to limit the displacement of the movable core 22 in another direction via the second stopper 119 made of the nonmagnetic material fixed to the projecting bottom portion 14f. Also, by making the second stopper 119 made of the nonmagnetic material into a simple structure composed of a single component and by rolling swaging the cylindrical portion 119d passing through the through hole 121 of the projecting bottom portion 14f so as to plastically deform the cylindrical portion 119d and to manufacture easily, the manufacturing costs can be reduces. In addition, in other embodiment, the second stopper 119 is inserted from the inner side of the housing 14 (see FIG. 10A), but not limited to this. For example, the second stopper 119 may be inserted into the through hole 121 from an outer side of the housing 14, and the cylindrical portion 119d may be pressed by a rotation axis M of a roiling swaging apparatus provided inside of the housing 14 so as to be plastically deformed.

At an intermediate portion between both ends of the movable core 22 along the axial direction, a single plain bearing 36 which is attached to (pushed into) an annular recess 32 formed on the inner circumference surface of the cylindrical yoke 14b is provided, and the movable core 22 is slidably supported by the plain bearing 36 along the axial direction.

In the longitudinal section shown in FIGS. 8 and 9, the plain hearing 36 is composed of an annular body having a constant internal diameter along the axial direction. For example, the annular body may be a bearing composed by laminating an outer diameter layer (a back metal layer) made of a metal material such as a SPCC (Japanese Industrial Standards), etc., a sintered bronze layer (an intermediate layer) made by sintering a bronze, etc., and a resin layer (an internal diameter layer) which is a sliding surface to the movable core 22 and is made of a resin material such as Polytetrafluoroethylene resin, etc. For example, this bearing may be a sliding bearing having a self-lubricity, and can enhance the slidability by using the sliding bearing having such a self-lubricity.

Internal diameter surface of the plain bearing 36 which slidingly contacts the outer circumference surface of the movable core 22 is provided to be projected from the inner circumference surface of the cylindrical yoke 14b by a predetermined length T in the radial direction (see FIG. 8). Therefore, the movable core 22 slidingly contacts only the plain bearing 36, and a gap 37 corresponding to the projection length (the predetermined length T) is formed in the radial direction between the inner circumference surface of the cylindrical yoke 14b and the outer circumference surface of the movable core 22. This gap 37 functions as a magnetic gap in the radial direction between the movable core 22 and the cylindrical yoke 14b in the radial direction.

In addition, at a region which is one end of the annular recess 32 of the cylindrical yoke 14b into which the plain bearing 36 is pushed and is adjacent to the fixed core 20, a tapering surface 39 which functions as a guiding surface when the plain bearing 36 is attached to the cylindrical yoke 14b is formed.

In this way, by the plain bearing 36 arranged on the inner circumference surface of the cylindrical yoke 14b, the intermediate portion of the movable core 22 can be slidably supported. As a result, a straight traveling stability of the movable core 22 can be obtained, the cylindrical yoke 14b can be made coaxial with the movable core 22 easily, and the hysteresis property of the linear solenoid portion 12 can be enhanced.

In other embodiment, by providing the nonmagnetic second stopper 119 which limits the displacement of the movable core 22 in another direction, a space in the housing 14 in which the movable core 22 is provided can be prevented from being contaminated easily, and the movable core 22 can be prevented from being affixed to the second stopper 119. In addition, in the other embodiment, in the second stopper 119, by swaging the cylindrical portion 119d passing through the through hole 121 of the projecting bottom portion 14f so as to be plastically deformed on an outer wall of the projecting bottom portion 14f and so as to be fixed to the projecting bottom portion 14f, the second stopper 119 can be held to the housing bottom surface 14c easily, the assembling operation can be facilitated, and the assembly performance can be enhanced. In addition, because other operational effects are the same as those of the above described embodiment, detailed explanation will be omitted.

What is claimed is:

1. A linear solenoid comprising:
   a linear solenoid portion which is provided in a housing, comprising:
   a coil provided in a coil assembly;
   a fixed core;
   a shaft-less cylindrical movable core which is attracted toward the fixed core when the coil is energized; and
   a cylindrical yoke which surrounds an outer circumference surface of the movable core,
   wherein a recess to which the movable core faces is formed on the fixed core, a first stopper which is made of a nonmagnetic material and limits a displacement of the movable core in one direction is provided in a hole which continues to the recess, and the first stopper is provided with an inserting hole through which a displacement transmission member to transmit the displacement of the movable core is inserted,
   wherein the first stopper is separated from the coil assembly and cylindrical yoke by the fixed core, and
   wherein the cylindrical yoke and the movable core are separated by a bearing provided on less than the entire inner surface of the cylindrical yoke, where the bearing has an internal surface that projects from the inner surface of the cylindrical yoke by a predetermined length in a radial direction, forming a gap having said predetermined length in a radial direction between the movable core and a portion of the cylindrical yoke not having a bearing projecting therefrom, and
   wherein said cylindrical yoke and said housing form a single structure.

2. A valve device comprising:
   a valve body having a plurality of ports through which a pressure fluid flows;
   the linear solenoid according to claim 1; and
   a valve operating mechanism which is provided within the valve body and has a valve element for switching between a communication state and a discommunication state among the plurality of ports by displacement of the movable core.

3. The linear solenoid according to claim 1, wherein
   the housing has a housing bottom surface which is provided at one end of the housing along an axis of the housing, and
   the housing bottom surface is provided with a second stopper which is made of a nonmagnetic material and limits the displacement of the movable core in another direction, and a swaging portion which swages the second stopper so as to hold it.

4. A valve device comprising:
   a valve body having a plurality of ports through which a pressure fluid flows;
   the linear solenoid according to claim 3; and
   a valve operating mechanism which is provided within the valve body and has a valve element for switching between a communication state and a discommunication state among the plurality of ports by displacement of the movable core.

5. The linear solenoid according to claim 1, wherein
   the housing comprises:
   a housing bottom surface which is provided at one end of the housing along an axis of the housing; and
   a projecting bottom portion which extends from the housing bottom surface,
   wherein the projecting bottom portion is provided with the second stopper which is made of the nonmagnetic material and limits the displacement of the movable core in another direction, and the second stopper is fixed to the projecting bottom portion by swaging a cylindrical portion passing through a through hole of the projecting bottom portion.

6. A valve device comprising:
   a valve body having a plurality of ports through which a pressure fluid flows;
   the linear solenoid according to claim 5; and
   a valve operating mechanism which is provided within the valve body and has a valve element for switching between a communication state and a discommunication state among the plurality of ports by displacement of the movable core.

7. The linear solenoid according to claim 1, wherein
   one or more bearings for slidably supporting the movable core are provided along an axis of the cylindrical yoke, and the one or more bearings project by a predetermined length from an inner circumference surface of the cylindrical yoke toward the movable core in a radial direction.

8. A valve device comprising:
   a valve body having a plurality of ports through which a pressure fluid flows;
   the linear solenoid according to claim 7; and
   a valve operating mechanism which is provided within the valve body and has a valve element for switching between a communication state and a discommunication state among the plurality of ports by displacement of the movable core.

* * * * *